US012688621B2

(12) United States Patent
Johnston

(10) Patent No.: US 12,688,621 B2
(45) Date of Patent: Jul. 21, 2026

(54) AUGMENTING SHARED DIGITAL CONTENT WITH DYNAMICALLY GENERATED DIGITAL CONTENT TO IMPROVE MEETINGS WITH MULTIPLE DISPLAYS

(71) Applicant: Microsoft Technology Licensing, LLC, Redmond, WA (US)

(72) Inventor: Mac Donald Scarpino Johnston, Media, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/766,575

(22) Filed: Jul. 8, 2024

(65) Prior Publication Data

US 2024/0362829 A1     Oct. 31, 2024

Related U.S. Application Data

(63) Continuation of application No. 17/845,705, filed on Jun. 21, 2022, now Pat. No. 12,033,243.

(51) Int. Cl.
*G06T 7/00*      (2017.01)
*G06F 3/01*      (2006.01)
*G06F 3/14*      (2006.01)
*G06T 7/50*      (2017.01)
*G06T 11/00*     (2006.01)

(52) U.S. Cl.
CPC .............. *G06T 11/00* (2013.01); *G06F 3/011* (2013.01); *G06F 3/017* (2013.01); *G06F 3/1423* (2013.01); *G06T 7/50* (2017.01)

(58) Field of Classification Search
CPC . G06T 11/00; G06T 7/50; G06F 3/011; G06F 3/017; G06F 3/1423
See application file for complete search history.

(56) References Cited

U.S. PATENT DOCUMENTS

2003/0207244 A1* 11/2003 Sakai ....................... G09B 7/02
                                                          434/350
2010/0037151 A1*  2/2010 Ackerman ............. G06Q 10/10
                                                          715/753

(Continued)

OTHER PUBLICATIONS

Communication pursuant to Article 94(3) EPC received for EP Application No. 23728512.7, mailed on Mar. 3, 2026, 13 pages.

*Primary Examiner* — Sahlu Okebato
(74) *Attorney, Agent, or Firm* — Ray Quinney & Nebeker P.C.; Christopher K. Hallstrom

(57) ABSTRACT

The present disclosure relates to systems, methods, and computer-readable media for utilizing a presentation enhancement system to provide enhancements for hybrid meetings (e.g., meetings where shared content is provided to multiple displays). For example, the presentation enhancement system generates dynamic digital content in response to detecting physical interactions of a presenting user with shared digital content on a display device. Further, the presentation enhancement system augments the shared digital content provided to a remote display device with the dynamic digital content. In addition to providing augmented shared digital content to remote display devices, the presentation enhancement system can perform several additional actions on the shared digital content based on the detected physical interactions.

20 Claims, 10 Drawing Sheets

Off-Screen Detection

(56)         References Cited

U.S. PATENT DOCUMENTS

| | | | |
|---|---|---|---|
| 2012/0081391 A1* | 4/2012 | Tan ....................... | G06F 3/0425 |
| | | | 345/620 |
| 2014/0368447 A1* | 12/2014 | Saini ..................... | G06F 3/1423 |
| | | | 345/173 |
| 2020/0293261 A1* | 9/2020 | Janamanchi ........ | H04L 12/1831 |
| 2022/0046186 A1* | 2/2022 | Fayad ................... | H04N 5/272 |
| 2023/0086906 A1* | 3/2023 | Tang ....................... | G06T 11/00 |
| | | | 715/753 |

* cited by examiner

Location A 300a

Location B 300b

400

Off-Screen Detection

800

AUGMENTING SHARED DIGITAL CONTENT WITH DYNAMICALLY GENERATED DIGITAL CONTENT TO IMPROVE MEETINGS WITH MULTIPLE DISPLAYS

CROSS-REFERENCE TO RELATED APPLICATIONS

This application is a Continuation of U.S. patent application Ser. No. 17/845,705 filed Jun. 21, 2022 (U.S. patent Ser. No. 12/033,243), the disclosure of which is incorporated herein by reference in its entirety.

BACKGROUND

Recent years have seen significant advancements in both hardware and software with respect to accessing, managing, and sharing digital content. For instance, modern computing systems enable users to communicate through the use of improved tools, such as collaborative document sharing and editing, video conferencing, and team messaging. As an example, modern computing systems enable users to conduct and participate in hybrid meetings where one or more of the users are located remotely from other users in the meeting.

Despite these and other advances, existing computing systems continue to face several technical shortcomings that result in inaccurate, inflexible, and inefficient operations, particularly in the area of hybrid meetings or meetings that provide digital content to multiple displays. Indeed, existing computer systems often fail to accurately provide data being communicated at hybrid meetings.

To illustrate, during a meeting, a user (i.e., a presenting user) often physically interacts with digital content being shared, such as by standing in front of a projected image or large screen showing the shared content. However, remote users in the meeting commonly are unable to clearly view the physical interactions or understand how the presenting user is interacting with the shared digital content. As a result, remote users are lost as to user interactions of the presenting user and are left to verbal cues, which are largely vague and insufficient. As another example, remote users see a video feed of the presenting user interacting with the shared digital content; however, the presenting user often blocks portions of the shared digital content or the smaller display of remote users renders it too difficult to accurately ascertain the content items with which the presenting user is physically interacting.

Despite these inaccuracies, existing computer systems do not provide options for accurately presenting and discussing information during these types of meetings. Indeed, existing computer systems are inflexible in the options they provide to overcome the inaccuracy problems presently faced in hybrid meetings. Currently, one solution is for a remote user to interrupt the presenting user to ask clarifying questions about the content items with which the presenting user is interacting. But these frequent interruptions further add inaccuracies and require additional time to properly convey this information, which sometimes is not possible.

Likewise, many existing computer systems suffer from inefficiencies with regard to hybrid meetings. For example, as noted above, due to the current methods of many existing computer systems, users participating in a meeting must often take additional steps and more time to clarify and communicate information. With respect to hybrid meetings, this additional time requires additional computer resources and bandwidth to be used between the users and one or more computer servers hosting the meeting. Indeed, because many existing computer systems fail to provide adequate solutions, these systems attempt to compensate by utilizing more computing resources than necessary.

These and other problems result in significant inflexibilities and inefficiencies of existing computing systems with respect to facilitating hybrid meetings and/or meetings that provide digital content to multiple displays including those of remote users.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
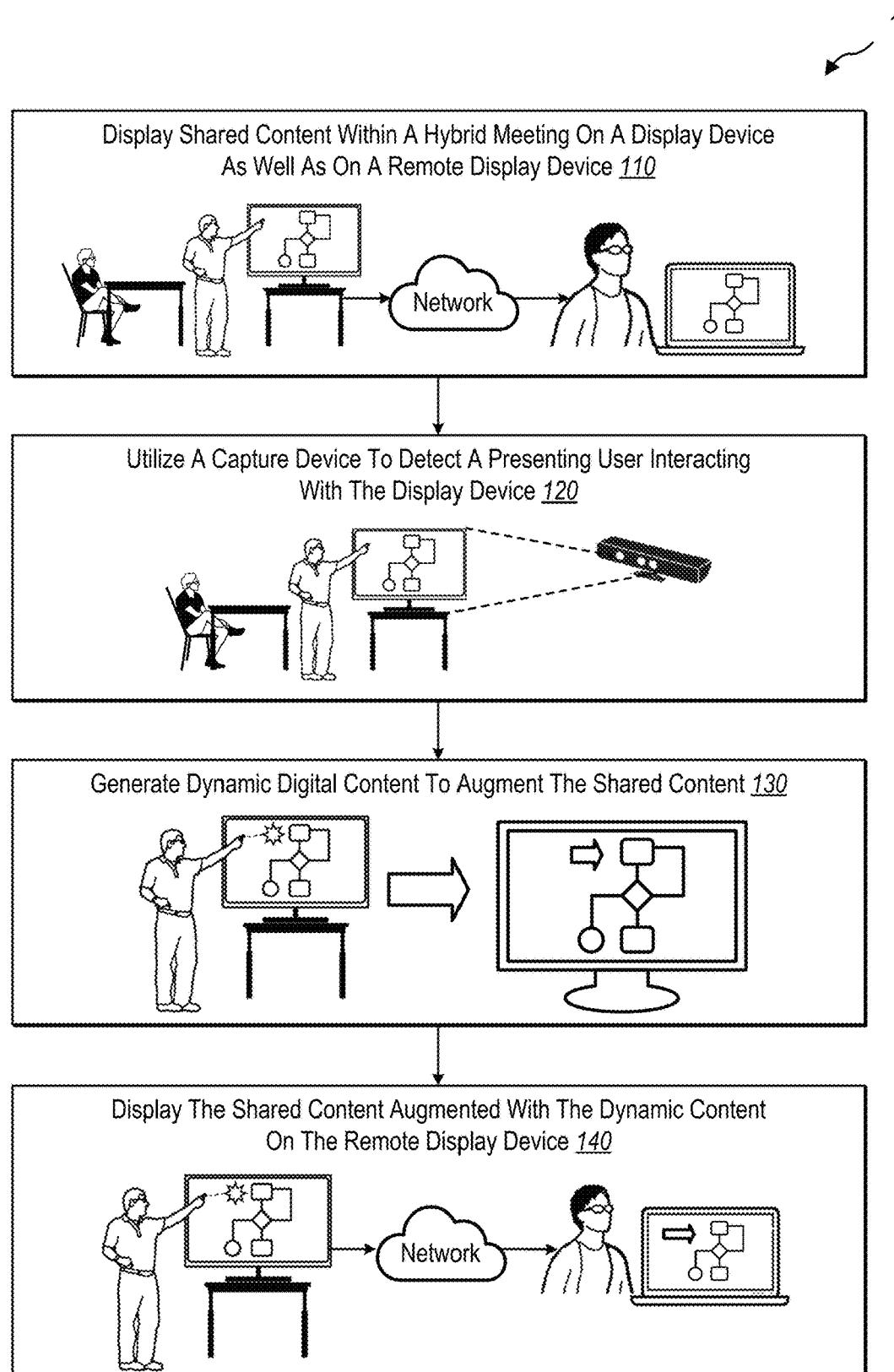
FIG. 1 illustrates an example workflow for efficiently generating dynamic content based on physical interactions of a presenting user with shared content within a hybrid meeting and displaying shared content augmented with the dynamic content on a remote display device in accordance with one or more implementations.

Implementations of the present disclosure provide benefits and/or solve one or more of the foregoing or other problems in the art with systems, non-transitory computer-readable media, and methods utilizing a presentation enhancement system that provides real-time enhancements for hybrid meetings (e.g., meetings where shared content is provided to one or more remote users associated with one or more displays). For example, in various implementations, the presentation enhancement system generates dynamic digital content in response to detecting physical interactions of a presenting user with shared digital content on a display device. Further, the presentation enhancement system augments the shared digital content provided to a remote display device with the dynamic digital content. In addition to providing augmented shared digital content to remote display devices, the presentation enhancement system can perform several additional actions on the shared digital content based on the detected physical interactions.

To further illustrate, in a number of implementations, the presentation enhancement system provides shared digital content to a first display device associated with a presenting user as well as to a second display device associated with a remote user. In some instances, the first display device associated with the presenting user projects an image of the shared digital content. In addition, the presentation enhancement system can detect, by a capture device, a physical interaction between the presenting user and the projected image of the shared digital content. In response, the presentation enhancement system can generate dynamic digital content with which to augment the shared digital content. Further, the presentation enhancement system can provide the shared digital content augmented with the dynamic digital content to the second display device associated with a second user.

As described herein, the presentation enhancement system provides several technical benefits in terms of computing accuracy, flexibility, and efficiency compared to existing computing systems. Indeed, the presentation enhancement system provides several practical applications that deliver benefits and/or solve problems associated with augmenting shared digital content with dynamically generated digital content to improve meetings with multiple displays.

To illustrate, in various implementations, the presentation enhancement system improves flexibility by providing a novel dynamic system for capturing and conveying real-world information (e.g., physical actions) presented in hybrid meetings for remote users. For example, in various implementations, the presentation enhancement system detects physical interactions of a presenting user with shared digital content projected on a first display device, such as a projector screen or large monitor. In response, the presentation enhancement system can generate dynamic digital content based on the detected physical interaction (e.g., hand motions, finger movements, gestures, spoken words) and generate a copy of the shared digital content that is augmented with the dynamic digital content. Further, the presentation enhancement system can provide the shared digital content enhanced with the augmented dynamic digital content to a second display device associated with a user remotely participating in the hybrid meeting.

As an example, in various implementations, the presentation enhancement system detects a presenting user physically pointing at various content items within the shared digital content at a first display device. In response, the presentation enhancement system determines a mapping between the physical action and the shared digital content. Additionally, the presentation enhancement system generates a dynamic pointer (or another type of indicator or visual element) and augments the shared digital content such that the dynamic pointer displays on the second display device to match the actions of the presenting user as they occur at the first display device. In this manner, the remote user can easily follow the actions and intents of the presenting user with respect to the shared content through the augmented dynamic digital content generated and provided by the presentation enhancement system.

Further, the presentation enhancement system can flexibly provide additional approaches for generating and providing dynamic digital content. For instance, in some implementations, the presentation enhancement system facilitates the manipulation of target content items based on the detected physical interactions with the target content items. In various implementations, the presentation enhancement system converts user actions into a digital format, such as converting written words and drawings by a presenting user to digital text and shapes to be shared with remote users.

In one or more implementations, the presentation enhancement system allows a presenting user to provide physical interactions away from the first display device. For example, in some implementations, the presentation enhancement system tracks user actions away from the first display device and conveys those actions to remote users who may be unable to see the presenting user. In this manner, the presentation enhancement system can flexibly and accurately provide meeting information to remote users who are not present at the meeting.

Further, as provided below, the presentation enhancement system can operate across a variety of computing devices having different hardware capabilities. For instance, the presentation enhancement system can operate on devices having a simple camera as well as on devices having multiple and/or sophisticated cameras, such as cameras that can generate depth maps.

As noted above, in various implementations, the presentation enhancement system improves the accuracy of computing systems. For example, the presentation enhancement system dynamically provides real-time information to remote display devices by digitally augmenting or enhancing shared content based on the physical actions of presenting users. Indeed, the presentation enhancement system provides information that is otherwise unavailable or missed by existing computer systems, which are currently unable to accurately provide such information.

The presentation enhancement system also improves efficiency over existing computer systems. For example, the presentation enhancement system saves computing device processing and resources by automatically detecting and dynamically providing augmented digital content. Indeed, the presentation enhancement system greatly reduces the number of steps needed to communicate information as well as reduces the time of hybrid meetings by streamlining communications based on providing augmented dynamic digital content.

Similarly, the presentation enhancement system improves efficiency by reducing navigational steps. For instance, rather than requiring another user be present at the meeting with the presenting user to manually annotate the actions of the presenting user (e.g., manually convert the actions of the presenting user into a digital format), which is tedious and requires numerous manual steps, the presentation enhancement system automatically detects, generates, and provides augmented dynamic digital content for remote users to be able to seamlessly follow along with the presenting user.

As illustrated in the foregoing discussion, the present disclosure utilizes a variety of terms to describe the features and advantages of one or more implementations described herein. For instance, the term "hybrid meeting" refers to a type of meeting that includes at least two users each associated with a display device. For example, a hybrid meeting includes a presenting user that is physically interacting with shared digital content projected on a first display device such as a projection screen or a digital monitor (e.g., the presenting user is using their fingers and/or hands to physically interact with a projected image of the shared digital content). In addition, a hybrid meeting also includes a second user that is participating in the meeting through a second display device. In some instances, the second user is located at a remote location apart from the presenting user (e.g., the presenting user is alone or with a group at one location and the remote user is at a second location). In other instances, the second user is at the same location as the presenting user but participating via the second display device (e.g., the second user is engaging in the meeting through their phone, laptop, or another display device as "in-room" participants). Notably, this last example may serve as an exception to the common meaning of the term hybrid meeting where users are not co-located.

As used herein, the term "display device" refers to a computing device that displays shared digital content with respect to the hybrid meeting. For example, a display device refers to a projector and/or a projection screen that provides a projection of shared digital content (i.e., a projected image). In another example, a displayed device may refer to a television or computer monitor that displays the shared digital content (i.e., also a projected image). In some cases, a single processing unit outputs shared digital content to both a first display device and a second display device. Additionally, a display device can include computing devices such as telephones, laptops, desktops, tablets, wearable devices, or other devices capable of displaying images or videos of digital content.

As used herein, the term "projected image" refers to digital content displayed on a physical surface with which a user can physically interact. For example, a display device provides a projected image of shared digital content on a wall or projector screen that enables a user to physically touch or point to content items of the shared digital content. In addition, a projected image can include an LED, LCD, smart screen, or another type of digital display with which a user can interact by touching, nearly touching, or otherwise physically reference.

As used herein, the term "digital content" (or simply content) refers to content that exists as digital data. In various implementations, digital content can include one or more digital content items. Examples of digital content items (or simple content items) can include text, images, audio, code, metadata, etc. In various implementations, digital content includes presentations, slides, videos, streams, audio, etc. Likewise, the term "non-digital content" refers to content created in a non-digital form, such as writing on paper or a whiteboard. In some instances, non-digital content is non-tangible, such as sign language or other gestures.

Similarly, the term "shared digital content" (or simply shared content) refers to content that is provided to multiple display devices, often at the same time. For example, the presentation enhancement system provides multiple instances of a presentation, videoconference call, image, and/or video stream to different display devices. In some instances, the presentation enhancement system may provide shared content to a first display device and provide copies (i.e., other instances) of the shared content, augmented with dynamic digital content, to additional display devices (e.g., remote display devices).

As used herein, the term "dynamic digital content" (or simply dynamic content) refers to digital content generated by the presentation enhancement system in response to detecting real-world or non-digital user interactions. In some implementations, dynamic digital content excludes or does not include user-generated content. In one or more implementations, dynamic digital content includes user-generated content that is modified by the presentation enhancement system. In various implementations, the presentation enhancement system can generate dynamic digital content that automatically updates as additional user interactions are detected. In example implementations, dynamic digital content includes audio sounds, audio cues, or an audio description. Often, the presentation enhancement system utilizes a capture device to detect physical user interactions.

As used herein, the term "physical interaction" refers to the physical movement by a user with respect to digital content being shared. For example, a presenting user physically interacts with a projected image of shared digital content by using their body (e.g., fingers, arms, head, face), speaking (e.g., issuing words, sounds, ques, commands), or by using tangible objects (e.g., pointers, markers, papers) to direct attention toward content items within the shared content. As another example, a physical interaction includes non-digital action or an action that occurs outside of a computing device. In most instances, the term user interaction refers to a physical interaction.

As used herein, the term "capture device" refers to a computing device with one or more cameras or sensors to facilitate capturing physical movement. In some instances, a capture device includes a computing device with a single camera that detects the physical movement of a user. In one or more instances, a captured device includes one or more cameras that provide the ability to create a depth map of a user, such as a capture device having two cameras that capture stereo images of a user, which can be used to generate a depth map of the user. As another example, the capture device can include a Lidar or similar sensors that detects object depths. In some instances, a capture device can also capture images after user movement has accrued, such as detecting writing created by a user or objects moved by a user. Also, as used herein, a camera can include sensors that detect light or other reflected waves from a user or an object with which the user interacted.

As used herein, the term "presenting user" refers to a user that is utilizing physical movements to interact with a projected image. For example, a presenting user uses their fingers, hands, and/or arms to reference content items within a projected image. As another example, presenting user uses visual cues (e.g., gestures) or audio cues (e.g., keywords) to interact with shared content via a projected image. In some embodiments, a presenting user draws, writes, or otherwise provides markings in connection with a projected image as part of a hybrid meeting. In various implementations, a hybrid meeting can include multiple presenting users. As one example, a hybrid meeting between two users can alternate between which of the users is the presenting user. In some examples, the presentation enhancement system detects multiple presenting users acting at the same time.

As used herein, the term "remote user" refers to a user participating in the hybrid meeting that is using a second display device to view the shared content. For example, a remote user is located at a location separate from the presenting user. In another example, a remote user is located at the same location as the presenting user but is using a different display device than the display device with which the presenting user is physically interacting.

Turning now to the figures, FIG. 1 illustrates an example workflow for efficiently generating dynamic content based on physical interactions of a presenting user with shared content within a hybrid meeting and displaying shared content augmented with the dynamic content on a remote display device in accordance with one or more implementations. As shown, FIG. 1 illustrates a series of acts 100, where the acts can be performed by the presentation enhancement system and/or a content management system.

As shown in FIG. 1, the series of acts 100 includes an act 110 of displaying shared content within a hybrid meeting on a display device as well as on a remote display device. For instance, in one or more implementations, the presentation enhancement system facilitates a hybrid meeting where shared content (e.g., a presentation) is displayed on a first display device associated with a presenting user as well as on a second display device (e.g., the remote device) associated with the remote user. For example, the presenting user is interacting with a display device showing a flowchart within an office conference room and the remote user is participating in the hybrid meeting from home and sees the flowchart on their home computing device. Additional detail with respect to displaying shared content for a hybrid meeting on multiple display devices is provided below in connection with FIG. 3.

As also shown, the series of acts 100 includes an act 120 of utilizing a capture device to detect a presenting user interacting with the display device. For example, in one or more implementations, the presentation enhancement system utilizes a capture device to detect the physical movement of the presenting user as they interact with the display device. In some cases, the capture device is attached or incorporated within a portion of the display device. In other cases, the capture device is a separate device that captures the physical movement of the presenting user. For example, the presentation enhancement system captures the user pointing to a portion of the flowchart noted above. Additional detail with respect to capturing physical user actions is provided below in connection with FIG. 3, FIG. 5, and FIGS. 6A-6B.

As shown in FIG. 1, the series of acts 100 includes an act 130 of generating dynamic digital content to augment the shared content. For example, the presentation enhancement system analyzes the detected physical user action with the shared content to determine the intent of the presenting user with respect to the shared content. Further, the presentation enhancement system generates dynamic digital content corresponding to the intents and actions of the presenting user. In many implementations, the dynamic digital content augments (e.g., adds or modifies) one or more content items of the shared content. For example, the presentation enhancement system generates a pointer (i.e., visual element) and maps it to the location where the user is detected to be physically pointing at the flowchart.

In some implementations, the presentation enhancement system utilizes one or more models to generate the dynamic content. For example, the presentation enhancement system utilizes a motion detection model, a pointer detection model, a gesture detection model, an annotation detection model, a facial detection model, and/or an environmental collaboration model to determine and generate dynamic digital content that can augment the shared digital content provided to remote users. Additional detail regarding generating dynamic digital content is provided below in connection with FIG. 4.

As also shown in FIG. 1, the series of acts 100 includes an act 140 of displaying the shared content augmented with the dynamic content on the remote display device. For example, the presentation enhancement system provides the remote display device with a copy of the shared content that has been augmented by the dynamic content of the pointer device. For instance, in the flowchart example above, the presentation enhancement system automatically generates and maps a pointer (i.e., pointer visual element) or another type of visual element indicator to a target location within the shared content that matches or approximates where the presenting user is physically pointing and provides it to the second display device. In this manner, the remote user can automatically, easily, and accurately see within the shared content how and where the presenting user is physically interacting with the shared content. Additional detail regarding providing augmented dynamic digital content to one or more display devices is provided below in connection with FIG. 3.

As provided below, the presentation enhancement system can perform several additional actions based on the detected movements of the presenting user. For example, based on detecting different types of physical interactions with shared content, the presentation enhancement system can manipulate content items of the shared content, track the presenting user as they move away from the display device, transcribe or translate writings of the presenting user, enlarge or highlight portions of the shared content, etc.

Figure 2A:
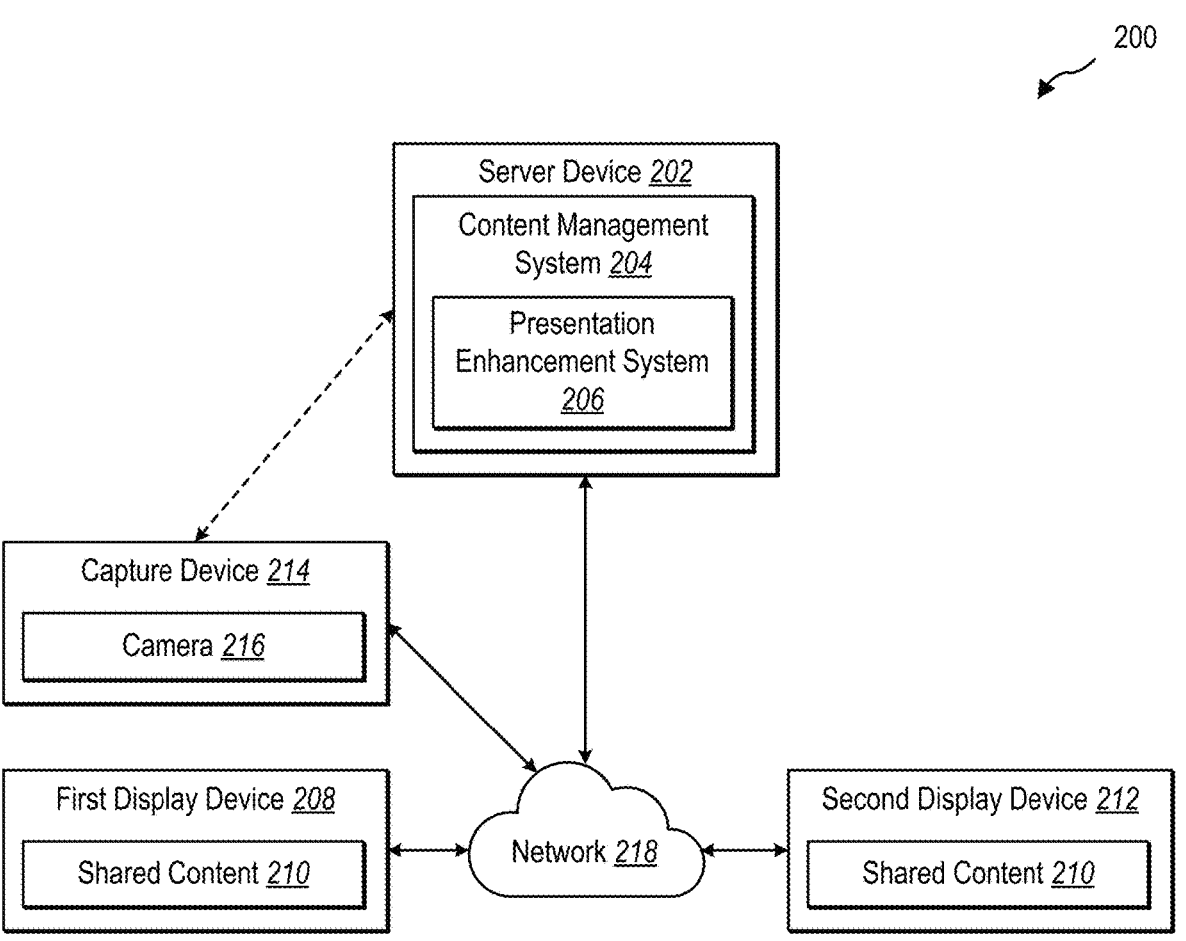
FIGS. 2A-2B illustrate a diagram of a computing system environment where a presentation enhancement system is implemented in accordance with one or more implementations.
Figure 2B:
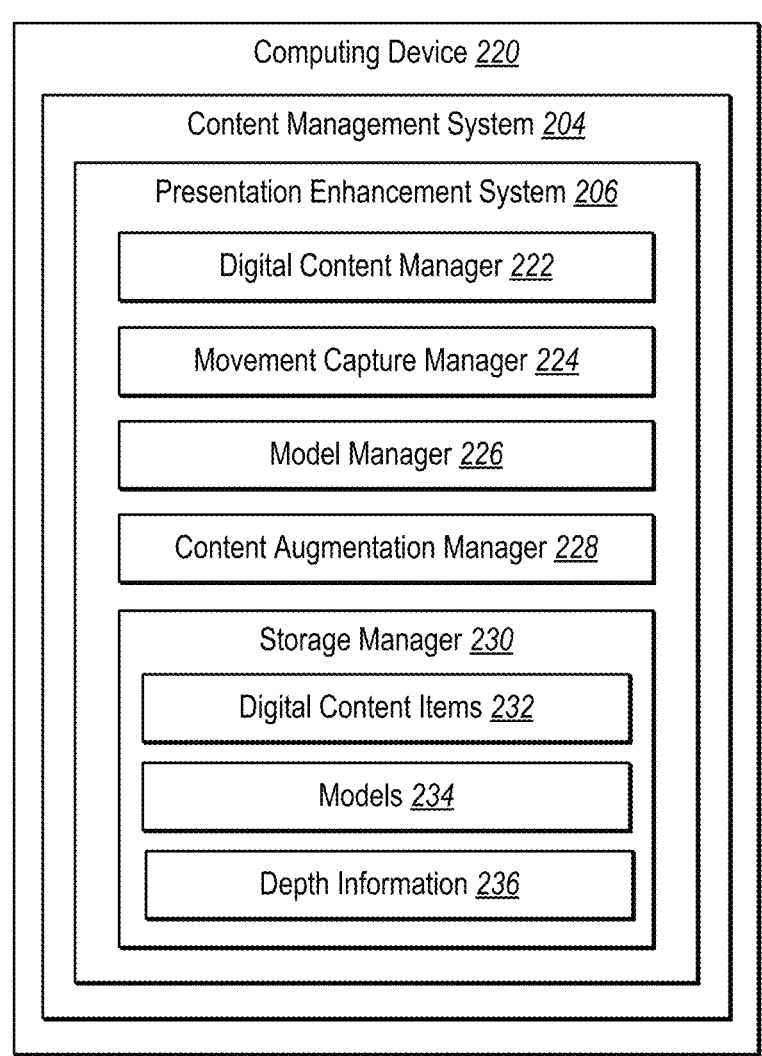

Additional detail is now provided regarding the components and elements of the presentation enhancement system. For example, FIGS. 2A-2B illustrate a schematic diagram of an environment 200 (i.e., a digital medium system environment) for implementing a presentation enhancement system 206. In particular, FIG. 2A includes the environment 200 and FIG. 2B provides additional detail regarding components and elements of the presentation enhancement system 206.

As shown in FIG. 2A, the environment 200 includes a server device 202, a capture device 214, a first display device 208, and a second display device 212 connected via a network 218. As shown, the server device 202 includes a content management system 204 having the presentation enhancement system 206, the capture device 214 includes a camera 216, the first display device 208 includes shared content 210, and the second display device 212 also includes the shared content 210. Additional detail regarding these and other computing devices is provided below in connection with FIG. 8. In addition, FIG. 8 also provides additional detail regarding networks, such as the network 218 shown.

While the environment 200 includes a particular number of computing devices, the environment 200 can include any number of devices and various device arrangements. For example, the server device 202 can represent a cluster of server devices. As another example, the environment 200 can include additional display devices (e.g., client devices). In various implementations, the capture device 214 can be part of the first display device 208.

As noted above, the environment 200 includes the client devices such as the first display device 208 and the second display device 212. As shown, both the first display device 208 and the second display device 212 display the shared content 210 as part of a hybrid meeting. Additionally, in one or more implementations, the first display device 208 is associated with a presenting user who is interacting with the shared content 210 via the first display device 208, and the second display device 212 is associated with a remote user that participates in the hybrid meeting by viewing the shared content 210 on the second display device 212.

As shown, the server device 202 includes the content management system 204. For example, the content management system facilitates hybrid meetings between display devices. Additionally, the content management system 204 can provide the shared content 210 to the display devices. The content management system 204 is further described below in connection with FIG. 2B.

Additionally, as shown, the content management system 204 can include the presentation enhancement system 206. As described in detail below, the presentation enhancement system 206 detects, generates, and provides augmented dynamic digital content to the second display device 212 based on detecting physical user interactions between a presenting user and the first display device 208. Indeed, the presentation enhancement system 206 flexibly provides augmented dynamic digital content to the second display device 212 that automatically allows a remote user associated with the second display device 212 to quickly and accurately understand the physical actions of the presenting user with respect to the shared content 210 at a separate location without requiring additional computing resources and without wasting excessive bandwidth, as described above.

As mentioned above, FIG. 2B provides additional detail regarding the capabilities and components of the presentation enhancement system 206. To illustrate, FIG. 2B shows a computing device 220 that includes the content management system 204 and the presentation enhancement system 206. In various implementations, the computing device 220 represents the server device 202. In some implementations, the computing device 220 represents the first display device 208 and/or the second display device 212 (e.g., the presentation enhancement system 206 is located on the first display device 208).

As shown, the computing device 220 includes the content management system 204. In various implementations, the content management system 204 can perform a variety of functions. For example, in one or more implementations, the content management system 204 facilitates the distribution of digital content between computing devices. In some implementations, the content management system 204 facilitates, identifies, receives, accesses, opens, loads, edits, modifies, moves, copies, shares, saves, removes, deletes, stores, downloads, transmits, and/or imports digital content.

As noted above, in some implementations, the content management system 204 can facilitate hybrid meetings between client devices. For example, the content management system includes video conferencing capabilities that facilitate audio and/or video sessions between multiple client devices as part of a hybrid meeting. In addition, the content management system 204 can facilitate the sharing of digital content to multiple client devices as part of hybrid meetings.

As also shown, the content management system 204 includes the presentation enhancement system 206. In various implementations, the presentation enhancement system 206 is located apart from the content management system 204. For instance, the presentation enhancement system 206 is located on the same computing device or devices as the content management system 204, but as a separate system. In some cases, the presentation enhancement system 206 and the content management system 204 or located on different computing devices.

As shown, the presentation enhancement system 206 includes various components and elements. For example, the presentation enhancement system 206 includes a digital content manager 222, a movement capture manager 224, a model manager 226, a content augmentation manager 228, and a storage manager 230. As also shown, the storage manager 230 can include digital content items 232, models 234, and depth information 236.

As shown, the presentation enhancement system 206 includes the digital content manager 222. In one or more implementations, the digital content manager 222 receives, accesses, provides, edits, modifies, identifies, creates, or otherwise manages digital content, including digital content items 232. In some implementations, the digital content manager 222 facilitates digital content items that are part of the shared content (i.e., shared digital content) provided to multiple display devices as part of a hybrid meeting. In various implementations, the digital content manager 222 also facilitates adding dynamic digital content to the shared content. In certain implementations, the digital content manager 222 communicates with the content management system 204 to provide the shared content and/or augmented shared content within a hybrid meeting to one or more display devices.

As shown, the presentation enhancement system 206 includes the movement capture manager 224. In various implementations, the movement capture manager 224 facilitates identifying, determining, detecting, receiving, storing, accessing, or otherwise managing motion detection by users. For example, in various implementations, the movement capture manager 224 communicates with a capture device to detect the physical movement of a presenting user interacting with a projected image of shared content. In some implementations, the movement capture manager 224 captures depth information 236 (e.g., image depth mappings) corresponding to user movement.

In one or more implementations, the movement capture manager 224 detects when a presenting user moves away from the display device to a second area. For example, the movement capture manager 224 tracks a presenting user as they move as well as detects when the presenting user has left a first area that includes the first display device and/or enters a second area that does not include the first display device. In some implementations, the movement capture manager 224 facilitates moving (e.g., rotating) a capture device if needed to track the movements of the presenting user. Additionally, according to some implementations, the movement capture manager 224 can monitor the actions of a presenting user within the second area, such as determining that the presenting user is writing on a surface, such as a whiteboard or posterboard.

As also shown, the presentation enhancement system 206 includes the model manager 226. In various implementations, the model manager 226 generates, identifies, modifies, accesses, provides, utilizes, selects, or otherwise manages one or more of the models 234. The models 234 can include machine-learning models, rule-based models, heuristic models, and other types of models. Examples of models include movement detection models, pointer detection models, gesture detection models, dictation detection models, facial recognition models, and environment calibration models among other various models. In various implementations, the model manager 226 assists in capturing and analyzing detected user movement.

As shown, the presentation enhancement system 206 includes the content augmentation manager 228. In various implementations, the content augmentation manager 228 generates, modifies, looks up, identifies, selects, or otherwise manages dynamic digital content to be augmented to shared content. For example, in various implementations, the content augmentation manager 228 communicates with the other managers of the presentation enhancement system 206 to determine the intent of the presenting user based on the detected physical interactions as well as generate dynamic digital content to augment the shared content. In example implementations, the content augmentation manager 228 determines the type of dynamic digital content with which to augment the shared content based on the outputs of one or more of the models 234.

Additionally, the presentation enhancement system 206 includes the storage manager 230. In various implementations, the storage manager 230 can include any data used by any of the components of the presentation enhancement system 206 in performing the features and functionality described herein.

Figure 3:
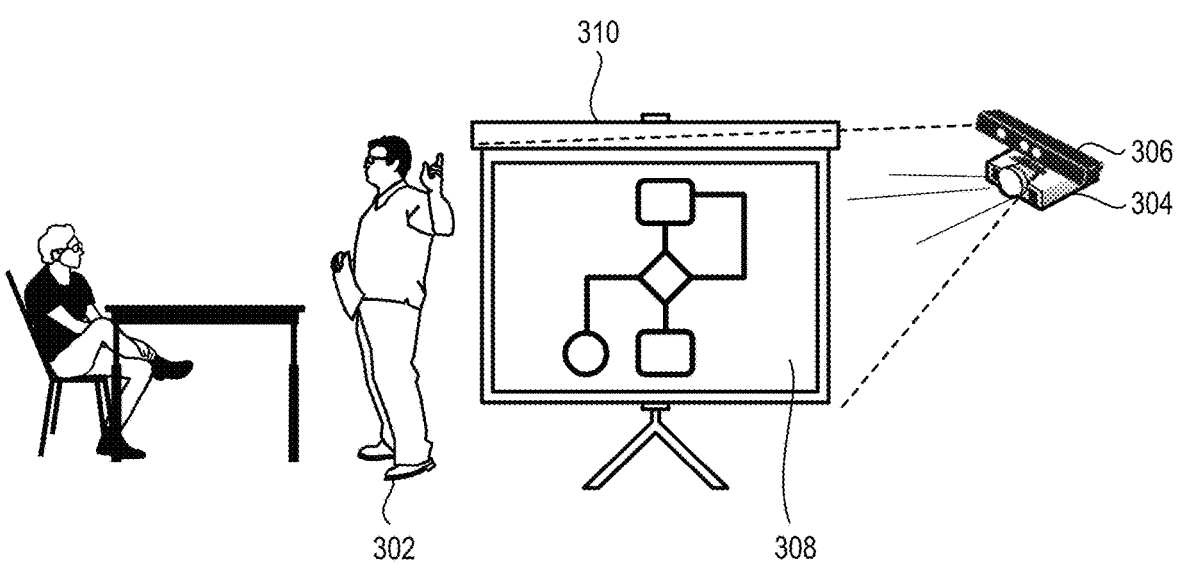
FIG. 3 illustrates an environmental diagram of the presentation enhancement system enhancing a hybrid meeting for remote users in accordance with one or more implementations.
Figure 3:
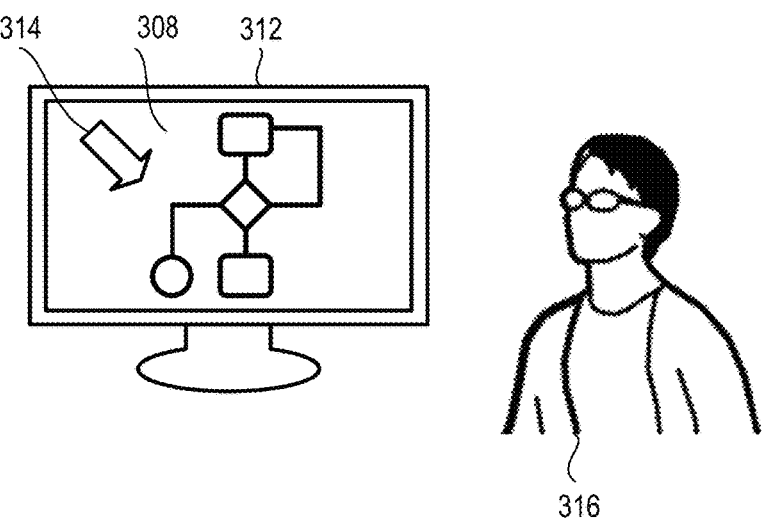

As mentioned above, FIG. 3 provides additional detail regarding displaying shared content for a hybrid meeting on multiple display devices, capturing physical user actions with respect to shared content, and providing augmented dynamic digital content to one or more display devices. In particular, FIG. 3 illustrates an environmental diagram of the presentation enhancement system enhancing a hybrid meeting for remote users in accordance with one or more implementations. While FIG. 3 portrays an example environment, the principles, approaches, and methods described in connection with FIG. 3 apply to other environments and situations.

As shown, FIG. 3 includes a hybrid meeting occurring at a primary location or first location (i.e., Location A 300a) with at least one remote user participating from a remote location or second location (i.e., Location B 300b). As illustrated, Location A 300a represents a conference room that includes a projector 304 (e.g., a first display device) that produces a projected image 310 of shared content 308 (i.e., a flow chart). Location A 300a also includes a presenting user 302 that is shown physically interacting with the shared content 308 via the projected image 310. As also shown, Location A 300a includes additional users that are viewing the presenting user 302 as they interact with the shared content 308.

Additionally, Location A 300a includes a capture device 306 that is detecting and capturing the physical movement of the presenting user 302 as they interact with the projected image 310 of the shared content 308. In some implementations, the capture device 306 is a separate device from the projector 304. According to some implementations, the capture device 306 is incorporated with the projector 304 (e.g., the first display device includes capture device capabilities). In various implementations, the capture device 306 is attached to the projector 304.

FIG. 3 also shows a remote or second location labeled as Location B 300b, which includes a remote user 316. As illustrated, Location B 300b also includes a second display device 312 associated with the remote user 316, such as a computer monitor that displays the shared content 308. Additionally, as shown in Location B 300b, the second display device 312 includes dynamic content 314 that augments the shared content 308.

As mentioned above, the presentation enhancement system 206 can provide the shared content 308 to the second display device 312 augmented with the dynamic content 314. As shown, the dynamic content 314 is a pointer arrow that indicates where the presenting user 302 is pointing with respect to the projected image 310 at Location A 300a. Indeed, the presentation enhancement system 206 can utilize the capture device 306 to detect the physical interaction of the presenting user 302 with the projected image 310 of the shared content 308, generate the dynamic content 314 based on the detected physical interaction and augment the shared content 308 with the dynamic content 314 at the second display device 312.

In some implementations, the presentation enhancement system 206 provides the dynamic content 314 to the second display device 312 without providing it to the first display device (e.g., the projector 304). For example, the presentation enhancement system 206 only augments the shared content 308 with the dynamic content 314 for remote users and not for users at the primary location (e.g., Location A 300a) who can see the presenting user 302. In this manner, users at the primary location (e.g., users viewing the projected image 310) and/or the presenting user 302 are not distracted by the dynamic content 314, which may compete with the presenting user 302 physical interactions.

In various implementations, the presentation enhancement system 206 generates dynamic content 314 that includes audio. For example, the presentation enhancement system 206 provides a pointer as well as an audio description of the location of the pointer and/or the element to which the participating user 302 is pointing. In this manner, the presentation enhancement system 206 can assist both remote users who are blind or low vision as well as remote users who are listening to a meeting (e.g., calling in and/or not watching). For example, the presentation enhancement system 206 provides audio dynamic content indicating that the presenting user 302 is pointing at "Column X" and "Row Y." In various implementations, the presentation enhancement system 206 provides controls to allow remote users to include audio dynamic content (e.g., toggle on or off). In some implementations, the presentation enhancement system 206 can include audio dynamic content automatically based on recognizing how the remote user is engaging with the hybrid meeting (e.g., audio only participant, watching on a computing device with a small form factor).

In one or more implementations, the presentation enhancement system 206 provides the dynamic content 314 to the primary location. For instance, when the presenting user 302 is standing in front of a larger version of the projected image 310 and cannot reach a target content item shown within the projected image 310, rather than using a laser pointer or physical pointing device, the presenting user 302 points to the desired content item and the presentation enhancement system 206 includes the dynamic content 314 at the location of the target content item. In another instance, regardless of the size of the projected image 310, the presentation enhancement system 206 includes the dynamic content 314 at the location of the target content item so as to provide real-time feedback to the presenting user 302 regrading where they are pointing. In this manner, the presentation enhancement system 206 enables the presenting user 302 to adjust their movements to more accurately and effectively communicate with in-person and remote users.

Further, in some implementations, the presentation enhancement system 206 can determine if the presenting user 302 is pointing at a content item within the projected image 310 that is located beyond a threshold distance of the presenting user 302 (e.g., based on utilizing depth information or where the presenting user is looking). For instance, if the presenting user 302 is pointing at a content item within the projected image 310 that is beyond two feet of their reach, the presentation enhancement system 206 can determine to display the dynamic content 314 within the shared content 308 at the Location A 300a. Otherwise, if the presenting user is pointing at a content item within the threshold distance (e.g., within the user's reach), the presentation enhancement system 206 hides the dynamic content 314 at the primary location (e.g., Location A 300a) but may show it at remote locations (e.g., Location B 300b).

As provided above, the presentation enhancement system 206 may assist a presenting user 302 by automatically pointing out target content items for remote users by adding dynamic content 314. In various implementations, the presentation enhancement system 206 can provide a variety of additional tools that benefit users of the hybrid meeting including remote users not at the primary location. To illustrate, the presentation enhancement system 206 can utilize movement information of the presenting user 302 to create dynamic content 314 that shows a shadow or outline of the presenting user 302 on the shared content 308 of the second display device 312.

To further illustrate, the presentation enhancement system 206 may allow a presenting user to manipulate content items. For instance, the presentation enhancement system 206 may analyze detected movements from the presenting user 302 and identify a gesture that corresponds to an action from manipulating a content item. For example, based on detecting the first type of gesture, the presentation enhancement system 206 may circle, highlight, or otherwise emphasize a content item. As another example, based on detecting a second type of gesture, the presentation enhancement system 206 may enlarge (e.g., zoom in on), shrink, or otherwise manipulate a content item. As another example, based on detecting a third type of gesture, the presentation enhancement system 206 may add text, shapes, or other objects to the shared content 308. Further details regarding additional tools provided by the presentation enhancement system 206 are described below in connection with FIG. 4.

As mentioned above, Location A 300*a* includes the capture device 306. In some implementations, the capture device 306 is incorporated within or attached to the first display device (e.g., the projector 304). For example, the capture device 306 is a device that includes one or more cameras pointed at the projected image 310 and is calibrated to detect the physical movement of presenting users. In some implementations, the capture device 306 includes the capability to generate depth maps of a presenting user, which can be used by the presentation enhancement system 206 to better determine actions, gestures, and movements by the presenting user 302. According to some implementations, the capture device 306 can rotate, move, or change focus areas to track a presenting user as they move to different areas within the primary location, which is further detailed below in connection with FIGS. 6A and 6B.

In various implementations, the presentation enhancement system 206 can perform a room calibration with respect to the capture device 306. For example, the presentation enhancement system 206 calibrates the capture device 306 to determine the location and coordinates of a projector screen or display that shows the projected image 310. In this manner, the presentation enhancement system 206 can compare the physical interactions of a presenting user 302 with the calibrated coordinates to determine the content items with which the presenting user 302 is interacting.

Figure 4:
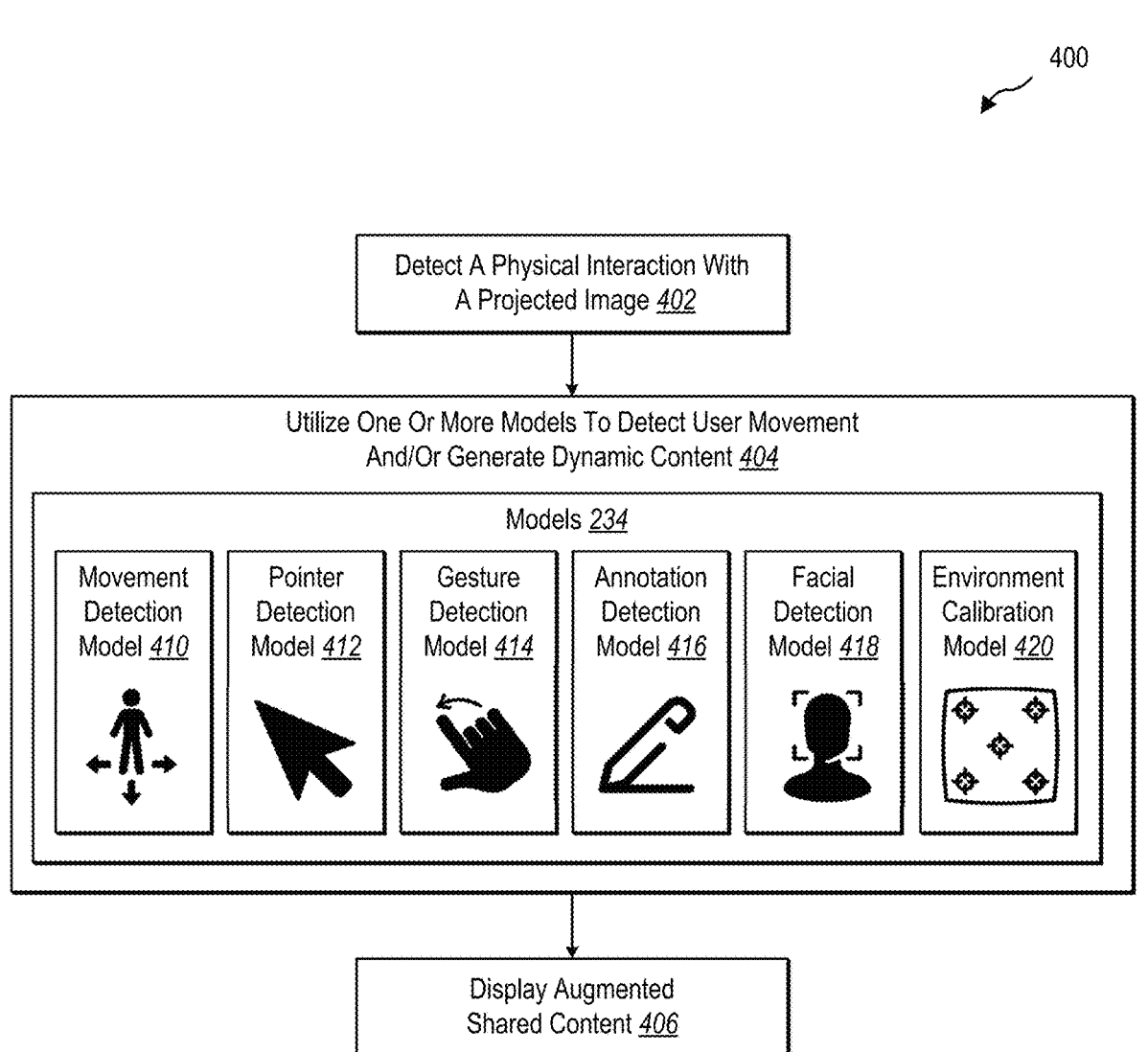
FIG. 4 illustrates a block diagram of the presentation enhancement system utilizing various models to display augmented digital content to remote users in accordance with one or more implementations.

Turning now to FIG. 4, additional detail is provided regarding how the presentation enhancement system 206 generates digital content based on detected physical movements and interactions of a presenting user. In particular, FIG. 4 illustrates the presentation enhancement system 206 utilizing various models to display augmented digital content to remote users in accordance with one or more implementations.

As shown, FIG. 4 includes a series of acts 400 performed by the presentation enhancement system 206. Specifically, the series of acts 400 includes a first act 402 of detecting a physical interaction with a projected image. For example, the presentation enhancement system 206 detects a presenting user interacting with a projected image of shared content at a primary location where the projected image is produced by or on a first display device.

In addition, the series of acts 400 includes an act 404 of utilizing one or more models to detect user movement and/or generate dynamic content. In particular, as shown, the act 404 is associated with the models 234, which are introduced above in connection with FIG. 2B. As also shown, the models 234 include a movement detection model 410, a pointer detection model 412, a gesture detection model 414, an annotation detection model 416, a facial detection model

418, and an environment calibration model 420. In various implementations, one or more of the models are machine-learning models, such as neural networks. Each of these models will be described below in turn.

As mentioned above, the models 234 can include the movement detection model 410. In various implementations, the movement detection model 410 facilitates detecting movement by a user based on analyzing data received from a capture device. For example, the capture device provides various sequential frames of images to the movement detection model 410, which can determine when movement is present as well as determine the types of movements being made by a presenting user. For instance, the movement detection model 410 can determine if a presenting user is pointing at a content item or making another type of gesture.

In one or more implementations, the movement detection model 410 can determine when the presenting user enters or exits a target area associated with a first display device, moves out of the target area, and/or moves into a second area. In some implementations, the movement detection model 410 determines that a presenting user is within the target area and is interacting with the projected image. In various implementations, the movement detection model 410 can determine when a presenting user is moving within the target area but is not interacting with the projected image.

As mentioned above, the models 234 can include the pointer detection model 412. According to various implementations, the pointer detection model 412 can determine a content item within the shared content with which a presenting user is interacting. Additionally, the pointer detection model 412 can generate dynamic content in the form of a pointer (i.e., pointer visual element) or another visual element indicator to visually signal the content item. In one or more implementations, the pointer detection model 412 communicates with the movement detection model 410 to identify physical interactions of a presenting user as part of generating a pointer or similar dynamic content.

In some implementations, the pointer detection model 412 can determine a target location for a pointer (i.e., pointer visual element) or other similar dynamic content that is close to the presenting user. For example, the pointer detection model 412 determines that a presenting user is touching, hovering over, or using an object (e.g., a physical pointer, marker, chalk) to physically call out a target content item within a projected image of shared content. Here, the presentation enhancement system 206 can utilize the pointer detection model 412 to generate a pointer as dynamic content that digitally calls out the target content item.

In one or more implementations, the pointer detection model 412 determines that a presenting user is pointing at a content item that is located further away from the user. For instance, the pointer detection model 412 utilizes a depth map or other depth information to determine the arm angle of the presenting user to determine if they are pointing at a nearby content item or a content item located farther away within the projected image. In some instances, the pointer detection model 412 determines that a presenting user is pointing at a content item located farther away based on knowing the size of the projected image to be larger than an average person (e.g., discovered through calibration or from technical specifications of the display device).

In various implementations, the pointer detection model 412 analyzes a combination of factors to determine where a presenting user is pointing. For example, the pointer detection model 412 analyzes the position of a presenting user's face to determine if they are looking at a content item located near their hand or at a content item located further away. Indeed, the pointer detection model 412 can use various methods to determine a target location at which the presenting user is pointing.

As mentioned above, the models 234 can include the gesture detection model 414. In various implementations, the presentation enhancement system 206 utilizes the gesture detection model 414 to identify different types of gestures and/or gesture magnitudes. For example, in response to user movement being detected (e.g., by the movement detection model 410), the gesture detection model 414 analyzes user movement data to determine if the user is making a particular gesture with their fingers, hands, arms, or other body movements. Upon detecting a particular gesture, the gesture detection model 414 may first determine an associated action. Then, the gesture detection model 414 generates dynamic content that corresponds to the action.

To illustrate, in one or more implementations, the gesture detection model 414 detects a presenting user performing a gesture to enlarge a target content item. In response, the gesture detection model 414 can augment or modify the shared content to enlarge the view of the target content item. Other gestures can correspond to highlighting, underlining, circling, drawing, or otherwise marking a target content item. In various implementations, the gesture detection model 414 may also respond to an audio cue, such as one or more keywords, that signals to the presentation enhancement system 206 that a gesture is to be made or that requests a particular type of gesture action to be applied to a target content item.

As mentioned above, the models 234 can include an annotation detection model 416. In various implementations, the annotation detection model 416 detects user movement that corresponds to writing. According to some implementations, the annotation detection model 416 detects words and other characters marked on a writing surface (e.g., a whiteboard, a poster board, paper). Further, the annotation detection model 416 can convert handwritten text of a presenting user into a digital version by transcribing the recognized text.

In some implementations, the annotation detection model 416 is triggered based on a user gesture or user action. For example, the annotation detection model 416 or another model detects when a presenting user picks up a marker, pen, piece of chalk, etc., and begins to write or draw. According to some implementations, the annotation detection model 416 detects writing on a surface after a user has begun to write, as noted above. Indeed, rather than actively detecting the presenting user's writing, the annotation detection model 416 detects previously written text and converts it into a digital version.

In various implementations, the gesture detection model 414 can also detect a presenting user drawing shapes, patterns, diagrams, or other figures. For instance, the gesture detection model 414 detects a presenting user drawing a flow chart on a whiteboard and generates a digital version of the flow chart, including both the shapes and the text.

According to some implementations, the gesture detection model 414 can generate digital versions of annotations as dynamic content to display with shared content, or in some cases, in place of the shared content. For example, the gesture detection model 414 can detect that a presenting user is modifying an existing flow chart shown in a projected image of shared content by adding additional boxes (e.g., through handwriting or gestures). Here, the gesture detection model 414 can augment the shared content by temporarily or permanently adding the additional boxes to the shared content.

In various implementations, the gesture detection model 414 generates a new piece of shared content that is provided to one or more digital displays. For example, upon detecting that a user is creating a new diagram or chart on a whiteboard, the presentation enhancement system 206 can utilize the gesture detection model 414 to create a digital version of the chart. The presentation enhancement system 206 can then provide the digital version of the chart to a remote display device as dynamic content, as the remote user is unable to see the handwritten version of the chart, or at least they are unable to see a clear version of the chart. In additional implementations, the presentation enhancement system 206 can provide the digital version of the chart to the first display device at the primary location. For instance, the presentation enhancement system 206 shows the digital version of the chart in place of the projected image and/or in connection with the projected image.

As mentioned above, the models 234 include a facial detection model 418. According to various implementations, the facial detection model 418 can utilize facial detection and recognition to determine a presenting user from among other users participating in a hybrid meeting. For instance, in some cases, the facial detection model 418 compares recognized faces to a database of known faces to determine if a person is authorized to be the presenting user. In various instances, the facial detection model 418 detects when multiple users are presenting.

In some implementations, the facial detection model 418 can determine where a presenting user is looking based on the position of their head or face. For example, based on determining that a presenting user is looking at a projected image, the facial detection model 418 (in connection with the presentation enhancement system 206) may provide additional digital content that indicates which user or users are presenting. For instance, the presentation enhancement system 206 includes a digital arrow along with an indication of the identity of a presenting user (e.g., their name, initials, or a color associated with their identity).

As mentioned above, the models 234 include an environment calibration model 420. For instance, the environment calibration model 420 can provide a mapping, or a partial mapping, of the primary location to determine where the first display device is located relative to other objects at the primary location. In this manner, the presentation enhancement system 206 utilizes the environment calibration model 420 to know when a presenting user is interacting with a projected image of shared content and/or when one or more presenting users are interacting with another type of object (e.g., such as writing on a whiteboard) to created shared non-digital content. As noted above, the presentation enhancement system 206 can utilize the environment calibration model 420 in connection with other models to generate dynamic content.

To illustrate, in one or more implementations, the environment calibration model 420 calibrates the capture device with respect to the first display device (e.g., a projector screen or monitor). For instance, the presentation enhancement system 206 utilizes the environment calibration model 420 to determine a location and/or coordinates of a projected image and/or the first display device. In some instances, the environment calibration model 420 identifies a target area associated with a projected image and/or the first display device to determine when a presenting user is interacting with the projected image. According to some implementations, the environment calibration model 420 can identify additional or second areas at the primary location that are away from the projected image of the first display device.

In some implementations, the environment calibration model 420 can detect the presence of particular objects at the primary location. For instance, the environment calibration model 420 can determine the presence of a chalkboard, whiteboard, or posterboard that is where the shared content will be projected (e.g., the projected image), adjacent to the projected image, and/or otherwise located at the primary location. For example, the environment calibration model 420 can determine based on image recognition or surface reflection that an object is a whiteboard or a piece of paper. In various implementations, the environment calibration model 420 can create second areas around particular objects such as whiteboards where one or more presenting users may write or draw (e.g., generate sharable non-digital content) during a hybrid meeting.

Additionally, as shown, the series of acts 400 includes an act 406 of displaying augmented shared content. For example, upon generating the dynamic content, the presentation enhancement system 206 augments shared content with the dynamic content and provides the augmented shared content to one or more remote display devices. In some implementations, the presentation enhancement system 206 also shows shared content augmented with the dynamic content on the first display device at the primary location.

Figure 5:
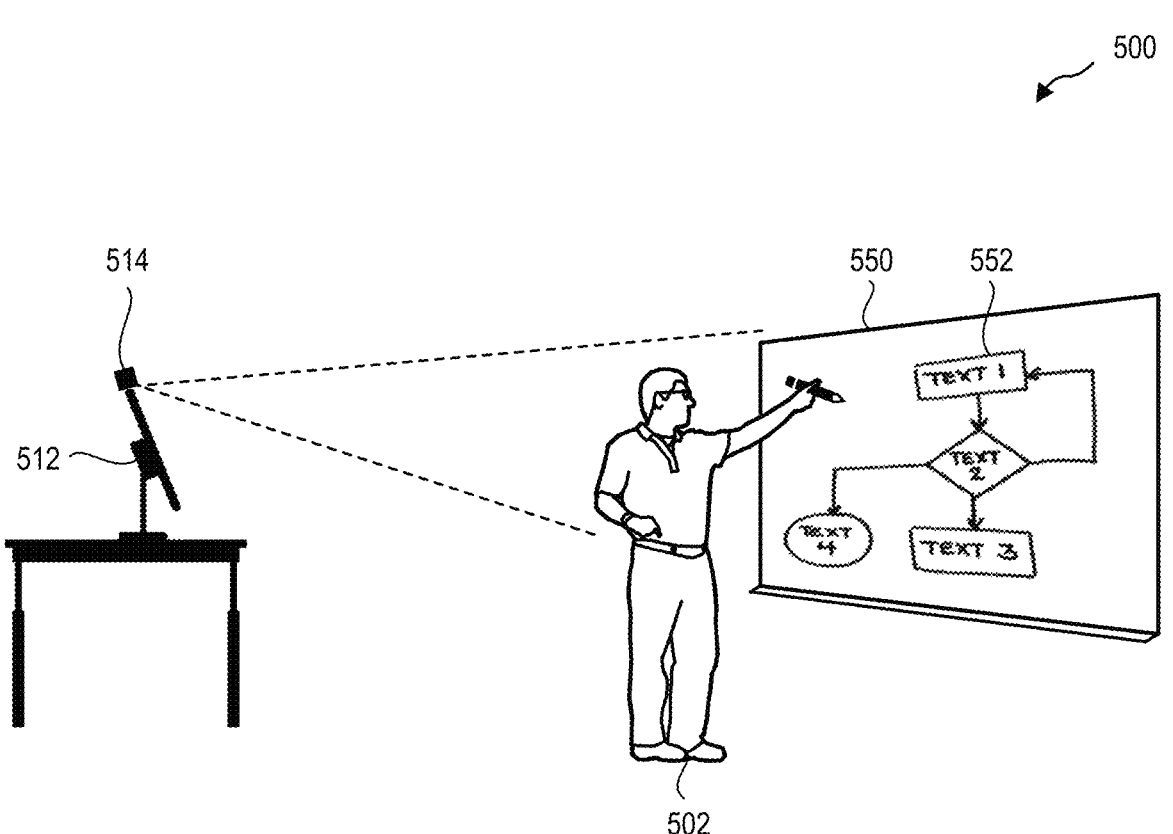
FIG. 5 illustrates an environmental diagram of the presentation enhancement system generating digital content based on physical interactions of a presenting user in accordance with one or more implementations.

Turning now to FIG. 5, example implementations are provided regarding a presenting user interacting with objects and surfaces other than a projected image. In particular, FIG. 5 illustrates an environmental diagram of the presentation enhancement system generating digital content based on the physical interactions of a presenting user in accordance with one or more implementations.

As shown, FIG. 5 shows an environment 500 that includes a presenting user 502 associated with a display device 512 and a capture device 514. In various implementations, the capture device 514 may be integrated into the display device 512. For example, the capture device 514 is a camera within a laptop, phone, or tablet. As another example, the capture device 514 is an external webcam or another type of camera. As also shown, the environment 500 includes the presenting user 502 providing non-digital content 552 (e.g., handwriting) on a whiteboard 550.

To illustrate, suppose the presenting user 502 is participating in a hybrid meeting and is remote from other users in the meeting. In some cases, the presenting user 502 was previously a non-presenting user or a remote user during a hybrid meeting and then becomes a presenting user. Also, while the environment 500 includes a presenting user 502 writing on a whiteboard 550, in other instances, the presenting user 502 may be writing on another surface, such as a piece of paper, that is captured by the capture device 514.

As described above, the presentation enhancement system 206 can detect user movement of the presenting user 502 providing non-digital content 552 on the whiteboard 550. In response, the presentation enhancement system 206 can generate a digital version of the non-digital content 552 and provide it as dynamic content with the hybrid meeting. For example, the presentation enhancement system 206 utilizes one or more models, such as the motion detection model and/or the annotation detection model, to recognize texts and shapes of the non-digital content 552 and generate corresponding digital content. Further, the presentation enhancement system 206 can provide the digital content within the hybrid meeting for one or more remote users to better see.

In some implementations, the presentation enhancement system 206 detects when a user edits the non-digital content 552. For example, after generating a digital version of the non-digital content 552, the presenting user 502 modifies the non-digital content 552 by adding, removing, editing, or moving an element. In response, the presentation enhancement system 206 can detect the element change and update the digital version accordingly as well as provide the updated digital version to the one or more remote users in the hybrid meeting.

In various implementations, the presentation enhancement system 206 detects when a presenting user places objects, such as pictures, notes, documents, etc. within the view of the capture device 514. In response, the presentation enhancement system 206 can create digital versions of these objects and/or share the digital versions of these objects as dynamic content. To illustrate, the presenting user 502 places multiple sticky notes on the whiteboard 550. In response, the presentation enhancement system 206 creates digital versions of the sticky notes and presents them as dynamic content within a hybrid meeting. In additional cases, if the presenting user 502 adds or removes a sticky note or repositions the sticky note, the presentation enhancement system 206 may update the dynamic content to reflect the change.

In some implementations, the presentation enhancement system 206 generates a digital version of the non-digital content 552 while purposely omitting the presenting user. For example, as a presenting user is generating the non-digital content 552, the presentation enhancement system 206 creates a real-time digital version to provide within the hybrid meeting. Thus, rather than seeing the presenting user writing in front of a whiteboard, a remote user instead sees the generated dynamic content. In some instances, the presentation enhancement system 206 can provide a smaller version of the presenting user and/or the environment 500 overlying, adjacent to, or otherwise in association with the dynamic content of the digital version of the non-digital content 552. Further, in various implementations, as the presenting user 502 interacts with the non-digital content 552, such as points to target elements, the presentation enhancement system 206 can generate dynamic content, such as a pointer, to augment the digital version provided to the remote users.

According to one or more implementations, the presentation enhancement system 206 can provide an indicator when the presenting user moves outside of a target area. For example, if the presenting user 502 moves outside of the view of the capture device 514, the presentation enhancement system 206 can provide an audible or visual notification to the presenting user via display device 512. In some instances, the presentation enhancement system 206 provides a notification or an alarm when it detects the non-digital content 552 provided by the presenting user 502 approaches near the edge or moves outside of the target area and/or the view of the capture device 514 (e.g., when writing of a presenting user travels outside of the capture device field of view). In this manner, the presentation enhancement system 206 can notify the presenting user 502 that portions of content are not being captured and/or provided to remote users.

Figure 6A:
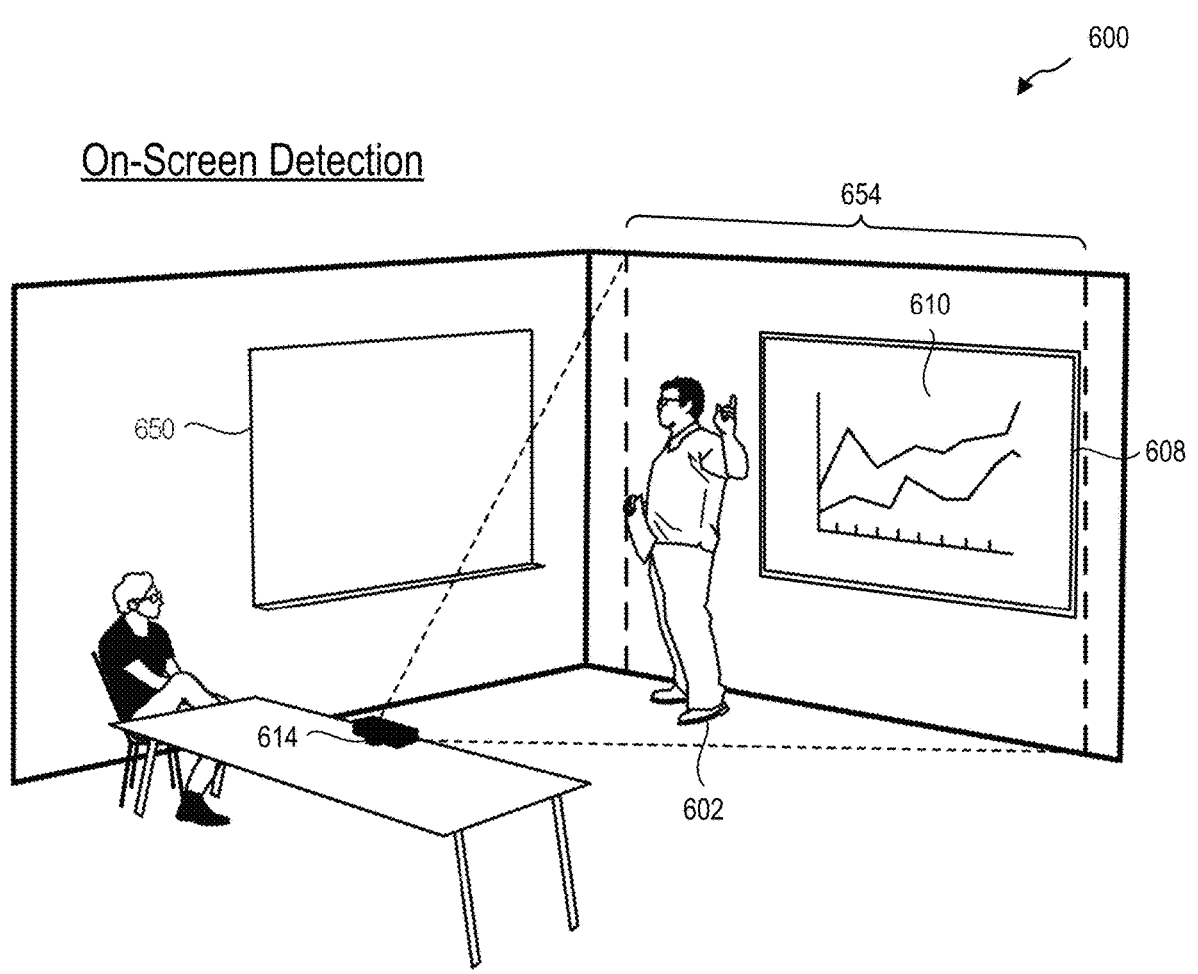
FIGS. 6A-6B illustrate environmental diagrams of the presentation enhancement system providing augmented digital content based on tracking user movement in a hybrid meeting in accordance with one or more implementations.
Figure 6B:
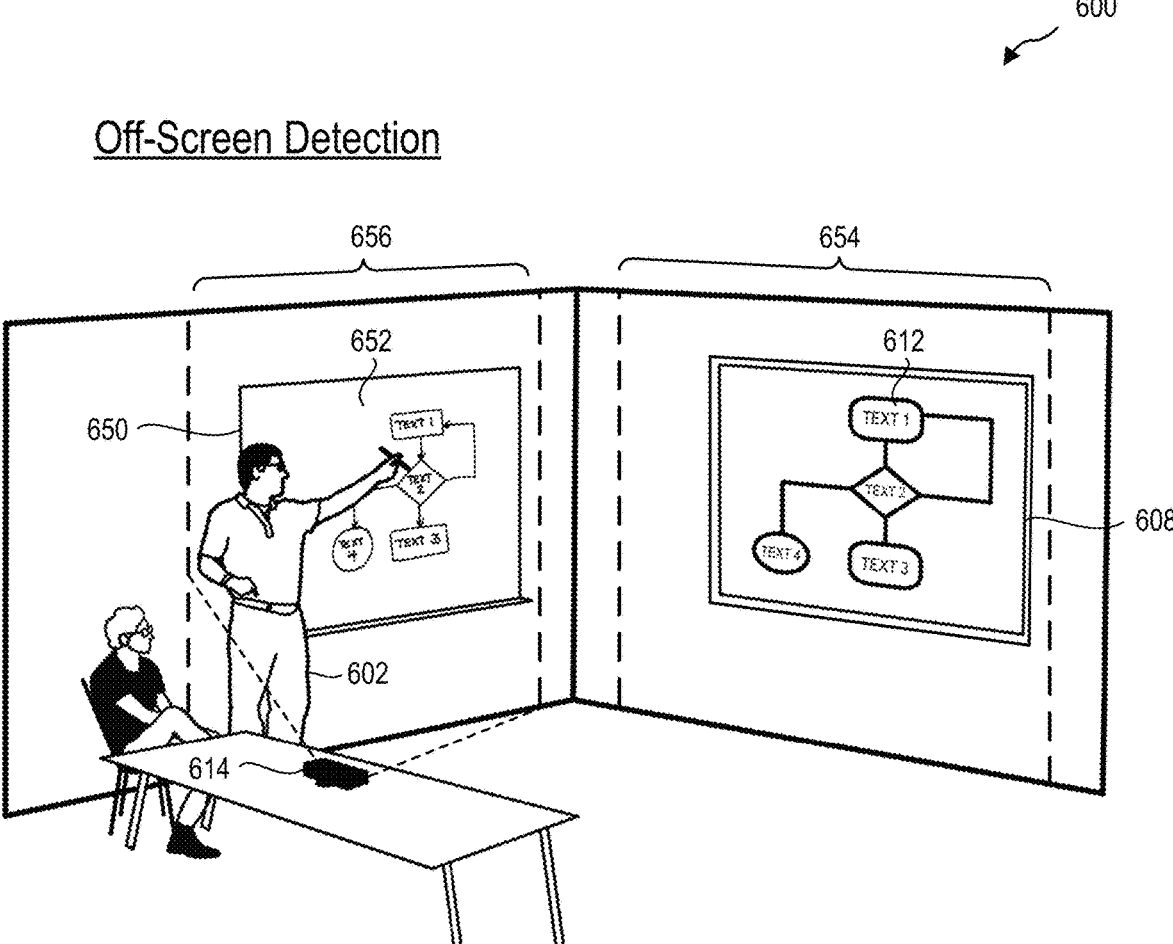

Turning now to the next set of figures, FIGS. 6A-6B illustrate environmental diagrams of the presentation enhancement system providing augmented digital content based on tracking user movement in a hybrid meeting in accordance with one or more implementations. As shown, FIGS. 6A-6B include an environment 600 of a conference room that includes a first display device 608 showing a projected image 610 of shared content, a capture device 614, and a whiteboard 650. FIGS. 6A-6B also include a target area 654 (e.g., a first area) associated with the first display device 608. Additionally, the environment 600 can correspond to a presenting user 602 participating in a hybrid meeting. While not shown, remote users may also be participating in the hybrid meeting.

As shown in FIG. 6A, a presenting user 602 is interacting with the projected image 610 on the first display device 608 (e.g., on-screen detection). In response, the presentation enhancement system 206 can provide dynamic content to remote users shown as augmented shared content, as described above. In particular, based on utilizing the capture device 614 to detect the physical movement of the presenting user 602 within the target area 654, the presentation enhancement system 206 can generate dynamic content to provide to remote display devices participating in the hybrid meeting.

According to some implementations, the presentation enhancement system 206 detects when the presenting user 602 moves outside of the target area into a second area. To illustrate, FIG. 6B shows the presentation enhancement system 206 detecting the presenting user 602 within a second area 656 (e.g., off-screen detection). For example, when the presenting user 602 moves away from the first display device 608 and outside of the target area 654 (e.g., a first area), the presentation enhancement system 206 utilizes the capture device 614 to detect the presenting user 602 moving into a second area 656. In some implementations, the capture device 614 has a field of view that includes both the target area 654 and the second area 656. In one or more implementations, the capture device 614 can move or rotate between at least the target area 654 and the second area 656 to track the physical movements of the presenting user 602. In various implementations, the presentation enhancement system 206 utilizes multiple capture devices to cover multiple areas in which presenting users can be.

While the target area 654 and the second area 656 are shown as separate areas, in some implementations, these areas may overlap. For example, the whiteboard 650 is located adjacent to or surrounding the projected image 610 or updated projected image 612. In these cases, the presentation enhancement system 206 may determine which area the presenting user 602 is in when the presenting user crosses the threshold out of an area that they were in first.

As mentioned above, the presentation enhancement system 206 can detect the presenting user 602 leaving the target area 654 and entering the second area 656. Further, as shown in FIG. 6B, the presentation enhancement system 206 detects the presenting user writing non-digital content 652 on the whiteboard 650. In response, the presentation enhancement system 206 can generate a digital version of the non-digital content 652 as dynamic content, as provided above, as well as provide the dynamic content to a remote display device. Additionally, as noted above, in various implementations, the presentation enhancement system 206 can update the dynamic content shown in the updated projected image 612 in real-time based on modifications that presenting user 602 makes to the non-digital content 652.

Additionally, in various implementations, as shown, the presentation enhancement system 206 can provide a copy or an instance of the dynamic content to the first display device 608. For example, the presentation enhancement system 206 replaces the projected image 610 on the first display device 608 with an updated projected image 612. In some instances, the updated projected image includes the dynamic content replacing the previously displayed shared content. In other instances, the updated projected image shows the dynamic content in connection with the shared content previously displayed in the projected image 610 (e.g., a split-screen).

While the above description corresponds to hybrid meetings that include remote users, one or more of the features and techniques described in connection with the presentation enhancement system 206 can be used outside of hybrid meetings. For example, the implementations described in connection with FIGS. 6A-6B can be used in a meeting setting when all users are co-located. For instance, the presentation enhancement system 206 can detect when a presenting user is writing non-digital content on a whiteboard in a second area and provide a digital version of the content on a digital display device within the room (e.g., on a laptop, desktop, projection screen, tablet) for meeting users to better see.

Figure 7:
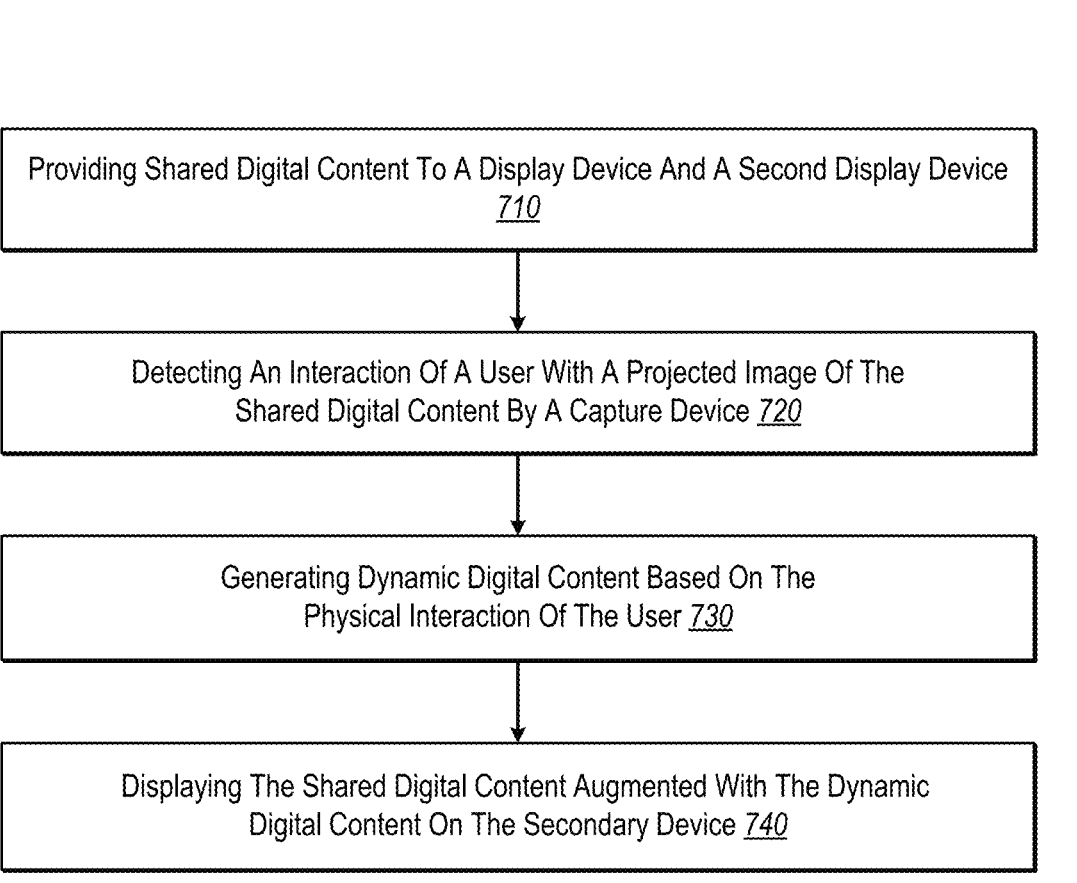
FIG. 7 illustrates an example series of acts for providing shared digital content augmented with dynamic digital content to remote users in accordance with one or more implementations.

Turning now to FIG. 7, this figure illustrates example flowchart including a series of acts 700 of augmenting shared digital content with dynamic digital content in accordance with one or more implementations. While FIG. 7 illustrates acts according to one or more implementations, alternative implementations may omit, add to, reorder, and/or modify any of the acts shown. Further, the acts of FIG. 7 can be performed as part of a method. Alternatively, a non-transitory computer-readable medium can include instructions that, when executed by one or more processors, cause a computing device to perform the acts of FIG. 7. In still further implementations, a system can perform the acts of FIG. 7.

As shown, the series of acts 700 includes an act 710 of providing shared digital content to a first display device and a second display device. For instance, the act 710 may include providing, to a first display device and a second display device, a shared digital content, where the first display device projects a projected image of the shared digital content.

In one or more implementations, the act 710 includes providing, to a projector and a remote computing device, shared digital content, where the projector projects an image of the shared digital content on a projection surface. In various implementations, the first display device is a projector, and/or the capture device is attached to the projector. In example implementations, the first display device is a digital display monitor, and/or the capture device is located away from the first display device. In one or more implementations, the second display device is located at a same location as the first display device. According to some implementations, the second display device is located at a remote location from the first display device.

As further shown, the series of acts 700 includes an act 720 of detecting an interaction of a user with a projected image of the shared digital content by a capture device. For example, the act 720 may involve detecting, by a capture device, a physical interaction of a presenting user with the projected image of the shared digital content. In one or more implementations, the act 720 includes detecting, by a camera of a capture device, a physical interaction of a presenting user with the projection surface displaying the projected image of the shared digital content.

In various implementations, the act 720 includes detecting a finger, hand, or arm gesture by the presenting user corresponding to manipulating the shared digital content. In some implementations, the act 720 includes utilizing a facial detection (e.g., facial recognition) model to identify the presenting user from other users. In example implementations, the act 720 includes generating a depth map from stereo images captured by the capture device. In additional implementations, the act 720 includes determining from the depth map that the physical interaction of the presenting user occurs away from the projected image of the shared digital content.

As further shown, the series of acts 700 includes an act 730 of generating dynamic digital content based on the physical interaction of the user. For example, the act 730 may include generating dynamic digital content with which to augment the shared digital content based on analyzing the physical interaction of the presenting user with the projected image of the shared digital content. In one or more implementations, the act 730 includes determining an action based on the physical interaction of the presenting user and/or generating dynamic digital content with which to augment the shared digital content based on the action.

In one or more implementations, the act 730 includes utilizing a movement detection model to determine a type of user movement. In multiple implementations, the act 730 includes utilizing a pointer detection model to map the physical interaction of the presenting user to a target location within the shared digital content and modifying the shared digital content by adding a visual element (e.g., pointer visual element) at the target location.

Additionally, in some implementations, the capture device includes a depth camera or a camera with depth perception capabilities that captures depth information of the presenting user. In various implementations, the act 730 includes utilizing depth information with the pointer detection model to map the physical interaction of the presenting user to a target location within the shared digital content, where the target location is located away from the presenting user and where modifying the shared digital content by adding a visual element at the target location. In example implementations, the dynamic digital content is displayed on the second display device without being displayed on the first display device.

Further, in various implementations, the act 730 includes utilizing an annotation detection model to convert the physical interaction of the presenting user to digital text or shapes as well as modifying the shared digital content to include the digital text or shapes. In one or more implementations, the act 730 includes utilizing a gesture detection model to convert the physical interaction of the presenting user to an action and modifying the shared digital content based on the action. In certain implementations, the act 730 includes determining a target location on the shared digital content away from the presenting user based on the depth map and the physical interaction of the presenting user and generating the dynamic digital content by adding a pointer visual element to the target location.

As further shown, the series of acts 700 includes an act 740 of displaying the shared digital content augmented with the dynamic digital content on the second display device. In one or more implementations, the act 740 includes displaying the shared digital content augmented with the dynamic digital content on the remote computing device. In various implementations, the act 740 also includes displaying the shared digital content without the augmented dynamic digital content on the first display device. In alternative implementations, the act 740 includes also displaying the shared digital content augmented with the dynamic digital content on the first display device.

In some implementations, the act 740 can include detecting, by the capture device, that the presenting user moves to a second area away from the projected image of the shared digital content; detecting user movement by the presenting user with a surface in the second area; generating an additional shared digital content based on the detected user movement with the surface in the second area; and providing the additional shared digital content on the remote computing device. In various implementations, the act 740 includes providing the additional shared digital content to the projector to be projected on the projection surface.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the presentation enhancement system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud-computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
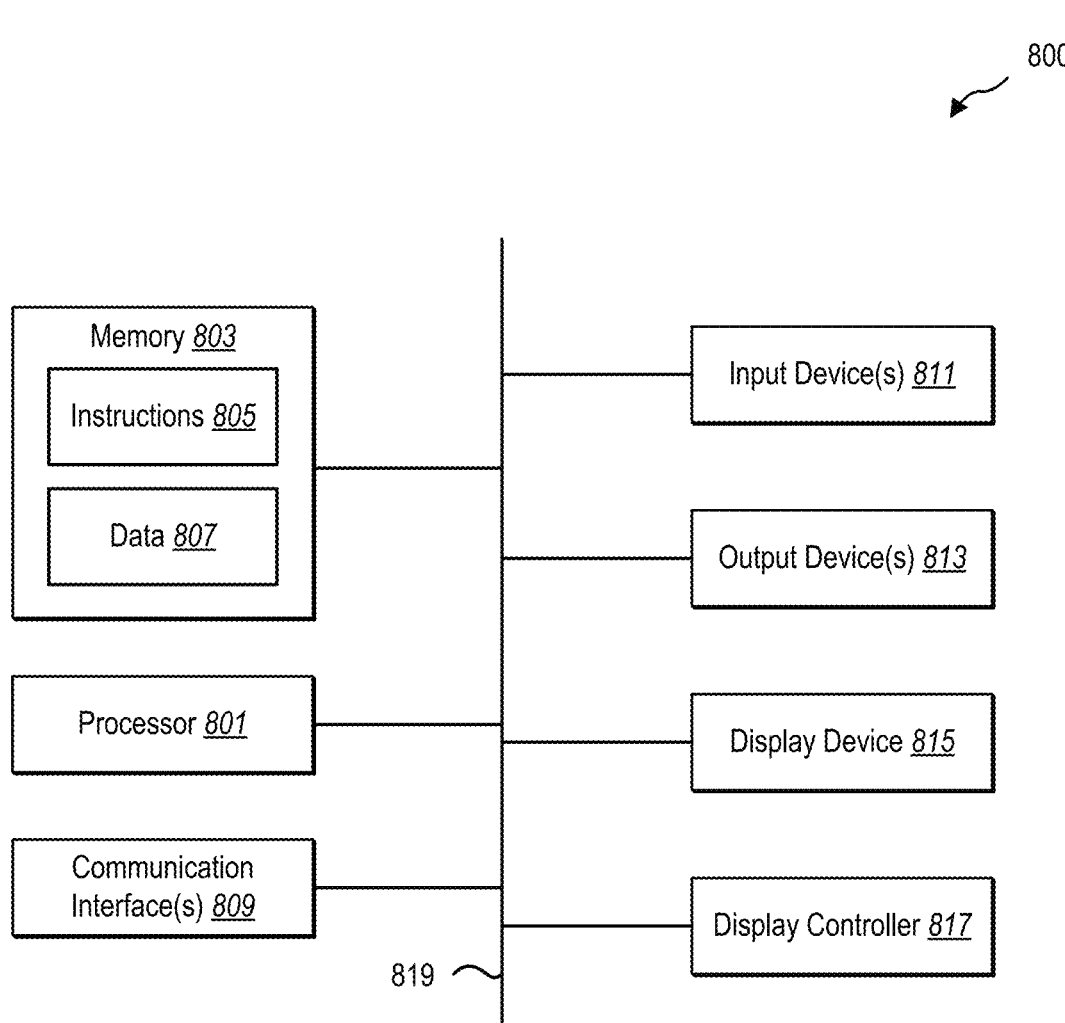
FIG. 8 illustrates certain components that may be included within a computer system.

FIG. 8 illustrates certain components that may be included within a computer system 800. The computer system 800 may be used to implement the various computing devices, components, and systems described herein.

In various implementations, the computer system 800 may represent one or more of the client devices, server devices, or other computing devices described above. For example, the computer system 800 may refer to various types of network devices capable of accessing data on a network, a cloud-computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud-computing system), or another non-portable device.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method comprising:
providing a first piece of digital content for display on a first display device within a first physical area;
detecting, by a capture device, a user interaction that creates non-digital content on a physical surface in a second physical area, wherein the second physical area is distinct from the first physical area, wherein the non-digital content includes handwritten text, shapes, or lines;
generating a second piece of digital content of the non-digital content detected from the user interaction with the physical surface in the second physical area; and
providing the second piece of digital content for display on the first display device within the first physical area.

2. The computer-implemented method of claim 1, wherein generating the second piece of digital content comprises generating a digital version of non-digital content captured from the physical surface in the second physical area.

3. The computer-implemented method of claim 2, further comprising updating the second piece of digital content in real-time based on detecting additional user interactions modifying the non-digital content on the physical surface in the second physical area.

4. The computer-implemented method of claim 1, wherein the user interaction is a non-digital physical interaction that occurs separately from components of the first display device.

5. The computer-implemented method of claim 1, wherein the first physical area is located adjacent to the second physical area.

6. The computer-implemented method of claim 1, wherein the capture device detects the user interaction with the physical surface in the second physical area by tracking a presenting user moving from the first physical area to the second physical area.

7. The computer-implemented method of claim 1, wherein:
the physical surface is a writing board; and
the writing board is a whiteboard, a chalkboard, or paper.

8. The computer-implemented method of claim 7, wherein detecting the user interaction includes:
detecting a user picking up a writing object; and
detecting the user writing on the writing board with the writing object.

9. The computer-implemented method of claim 1, further comprising sharing the first piece and the second piece of digital content with a second display device at a remote location as part of a hybrid video meeting.

10. The computer-implemented method of claim 9, wherein a viewing user at the remote location is unable to view the physical surface in the second physical area.

11. The computer-implemented method of claim 1, further comprising using a projector device as the first display device to project images of the first piece of digital content and the second piece of digital content on a projection surface in the first physical area.

12. The computer-implemented method of claim 11, wherein the capture device is associated with the first display device and the first physical area.

13. The computer-implemented method of claim 1, wherein providing the second piece of digital content for display on the first display device includes replacing the first piece of digital content.

14. The computer-implemented method of claim 1, wherein providing the second piece of digital content for display on the first display device includes displaying the first piece of digital content and the second piece of digital content together.

15. A system comprising:
a processor; and
a computer memory comprising instructions that, when executed by the processor, cause the system to carry out operations comprising:
providing a first piece of digital content for display on a first display device within a first physical area;
detecting, by a capture device, a user interaction that creates non-digital content on a physical surface in a second physical area, wherein the second physical area is distinct from the first physical area, wherein the non-digital content includes handwritten text, shapes, or lines;
generating a second piece of digital content of the non-digital content detected from the user interaction with the physical surface in the second physical area; and
providing the second piece of digital content for display on the first display device within the first physical area.

16. The system of claim 15, further comprising instructions that, when executed by the processor, cause the system to carry out operations comprising generating a digital version of non-digital content captured from the physical surface in the second physical area.

17. The system of claim 15 wherein detecting the user interaction includes detecting a user writing on the physical surface in the second physical area with a writing object to generate the non-digital content.

18. The system of claim 15, further comprising instructions that, when executed by the processor, cause the system to carry out operations comprising sharing the first piece and the second piece of digital content with a second display device at a remote location as part of a hybrid video meeting.

19. A computer-implemented method comprising:

providing a first piece of digital content to a projector, wherein the projector projects the first piece of digital content as a projected image on a wall or projection screen in a first physical area;

detecting, by a camera of a capture device that captures an image of at least a portion of a user, a user interaction that creates non-digital content on a physical surface in a second physical area, wherein the second physical area is distinct from the first physical area, wherein the non-digital content includes handwritten text, shapes, or lines;

generating a second piece of digital content based on the non-digital content detected on the physical surface in the second physical area; and providing the second piece of digital content to the projector for display as the projected image on the wall or projection screen in the first physical area.

20. The computer-implemented method of claim 19, wherein generating the second piece of digital content comprises generating a digital version of non-digital content captured from the physical surface in the second physical area.

* * * * *